United States Patent Office 2,849,497
Patented Aug. 26, 1958

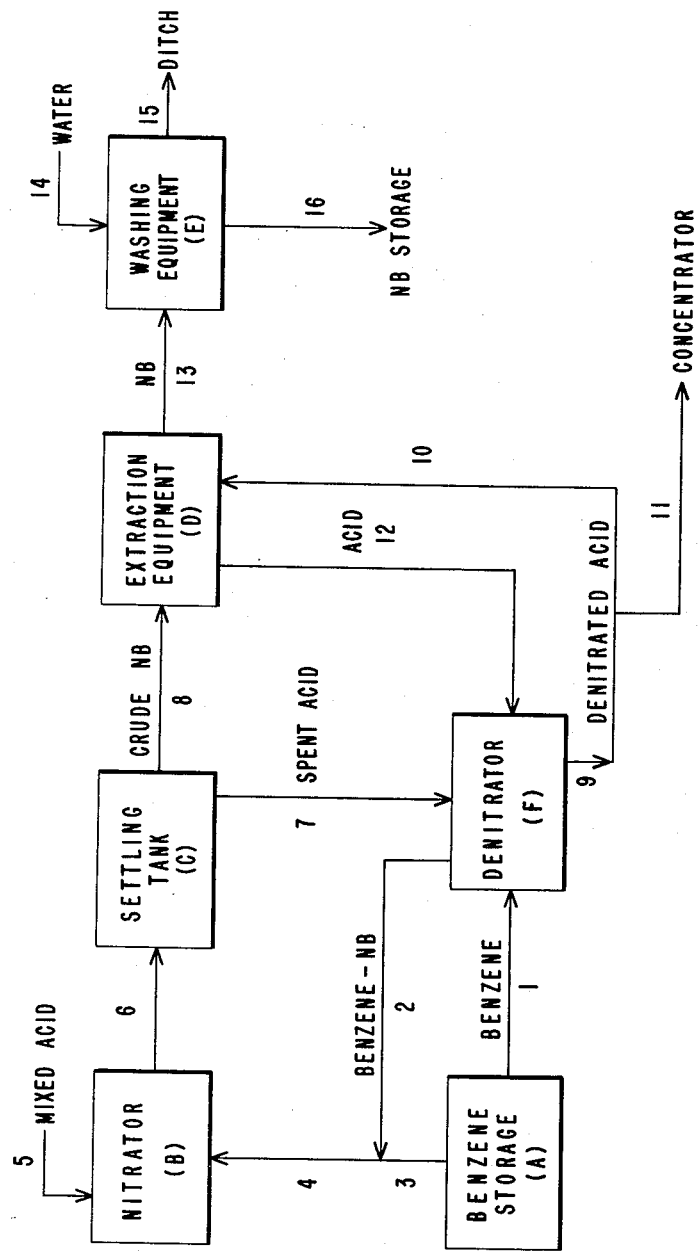

2,849,497

PREPARATION OF NITROBENZENE

Mike Edward Buchanan, Woodbury, N. J., assignor to E. I. du Pont de Nemours and Company, Wilmington, Del., a corporation of Delaware Application October 10, 1956, Serial No. 615,169

4 Claims. (Cl. 260—645)

The present invention relates to a process for the manufacture of nitrobenzene. More particularly, the invention relates to a continuous process for the manufacture of nitrobenzene which is convenient and economical.

Nitrobenzene is an organic chemical which finds widespread use in a number of industrial syntheses including, for example, the preparation of aniline. For many years nitrobenzene was prepared by introducing a charge of benzene batchwise into a nitrator and then feeding in slowly an aqueous mixture of nitric and sulfuric acids, and thereafter digesting the reaction mixture in the same vessel. More recently, attention has been focused in the industrial manufacture of nitrobenzene on a continuous process of preparation which involves contacting the spent acid which remains after the nitration with fresh benzene to use up the major portion of any unreacted nitric acid in the spent acid mixture. My invention is concerned with a continuous process of the latter type for the manufacture of nitrobenzene.

It is an object of the present invention to provide a continuous process for the preparation of nitrobenzene which utilizes to the fullest possible extent the primary reactants employed. It is a further object of the present invention to provide a continuous process of this type which is safe, convenient and economical. Other and additional objects will become apparent as the invention is more fully described.

I have found that the foregoing objects may be accomplished in a continuous process for the manufacture of nitrobenzene of the type described above by including as an essential feature of that process the step of extracting dissolved nitric acid in the crude nitrobenzene product by contacting the crude nitrobenzene with the denitrated waste acid and thereafter denitrating the waste acid containing this nitric acid with fresh benzene.

In order to more fully describe the invention, reference is made to the accompanying flow sheet which illustrates the continuous process of my invention. In the flow sheet, all of the units are labeled with a descriptive name and the direction of flow from and to each unit is indicated by an arrow with connecting lines. For simplicity, obvious mechanical details, such as equipment capacities, pumps, regulating valves, and the like have been omitted.

The operation of the process illustrated in the attached flow sheet is as follows: A mixed acid composition (nitric acid, sulfuric acid, and water) is fed into the nitrator B along with benzene from the storage tank A. The nitrator B is provided with any suitable agitation means to insure complete mixing of the reactants. The reaction products from the nitrator are transported to a setting tank C where two distinct layers form. The upper organic layer consists primarily of nitrobenzene with small amounts of dissolved nitric acid and the bottom layer consists primarily of sulfuric acid and water with small amounts of nitric acid and nitrobenzene. The organic layer continuously overflows to an extraction vessel D where it is contacted with denitrated spent acid; the latter coming from the denitrator F in which the residual nitric acid in the spent acid composition has been removed by contacting the latter with fresh benzene from tank A. The denitrated spent acid in the extraction equipment removes the dissolved nitric acid from the crude nitrobenzene and the denitrated spent acid thus refortified with the small amount of nitric acid is then directed back to the denitrator F where it is likewise contacted with fresh benzene from the storage tank A in the same fashion as was the initial spent acid stream 7 from the settling tank C. In most instances, a portion of the denitrated spent acid stream 9 will be separated off, as at 11, and sent to suitable concentration equipment. The nitrobenzene formed in the denitrator F as a result of the reaction of the fresh benzene there with small amounts of nitric acid which are carried into the denitrator via streams 7 and 12 is merged in benzene solution (due to excess benzene) with the fresh benzene stream 3 which feeds into the nitrator B.

The relatively pure nitrobenzene stream which emerges from the extraction vessel D now containing only a very minor amount of unreacted nitric acid is fed into washing equipment E which removes any such last traces of the acid. The wash water, which contains only trace amounts of nitric acid, is ditched as shown at stream 15, and the nitrobenzene is sent to storage as indicated at stream 16. Before being sent to storage, or at some time thereafter, the nitrobenzene may be further purified, as for example, by distillation.

The following table is a specific example of the invention which illustrates the operation of my continuous process. In the table, the numbers all represent pounds of material. Retention time of the reactants in the nitrator was about 15 minutes and the maximum temperature recorded during the nitration was about 145° F.

*Table I*

| Stream [1] | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Benzene | 70 | 62.2 | 8 | 70.2 | | | | | | | | | | | | |
| Nitrobenzene | | 15.3 | | 15.3 | | 123 | 3 | 123 | | | | | 123.0 | | | 123 |
| HNO$_3$ | | | | | 63.6 | 7 | 4 | 3 | 0.3 | 0.2 | 0.1 | 2.7 | 0.5 | | | |
| H$_2$SO$_4$ | | | | | 89.0 | 89 | 89 | | 168.3 | 79.8 | 89.0 | 79.8 | | | | |
| H$_2$O | | | | | 16.0 | 32.2 | 32.2 | | 64.5 | 30.5 | 34.0 | 30.5 | | 123 | 122.5 | 0.5 |

[1] The numerals refer to the numbered streams shown in the attached drawing.

According to my invention, the major portion of any nitric acid which remains in the crude nitrobenzene (stream 8) emerging from the settling tank C is removed by the denitrated spent acid which is thereafter contacted with the fresh benzene in the denitrator for the preparation of additional nitrobenzene. Nitric acid which is dissolved in the crude nitrobenzene product is thus advantageously used for the preparation of additional product rather than being washed out and purged. The present invention is thus an improvement over prior art techniques in that it greatly simplifies the washing and purification of the crude product while at the same time making possible the maximum utilization of the nitrating agent, nitric acid.

As is shown in Table I, 78 pounds of benzene (70 pounds in stream 1 plus 8 pounds in stream 3), which constitutes 1 mole of benzene, result in the production of 123 pounds of nitrobenzene product in stream 16. This represents a reaction efficiency of virtually 100%, based on the nitrobenzene. At the same time only 0.5 pound of nitric acid (the nitric acid which still remains in the nitrobenzene stream 13) of an initial charge of 63.6 pounds (stream 5) is ditched. This represents a reaction efficiency of over 99%, based on the nitric acid. The process thus makes maximum utilization of all the principal starting materials.

It will be readily apparent from the foregoing that the continuous process of the present invention represents an extremely economical technique for the continuous preparation of nitrobenzene from benzene. The invention has been described fully in the foregoing specification and a specific embodiment has been fully illustrated. My intention is to be limited only by the following claims.

I claim:

1. A continuous process for the manufacture of nitrobenzene which comprises (1) continuously introducing separately into a primary reaction zone a solution of nitrobenzene in benzene and an aqueous mixture of nitric and sulfuric acids, (2) continuously removing the reaction mass from said reaction zone and transferring said mass to a settling zone, (3) continuously removing acid-wet nitrobenzene from the top of said settling zone and spent acid from the bottom thereof, said spent acid being transferred to a denitrating zone, (4) continuously introducing benzene to said denitrating zone and agitating same with said spent acid to remove the major portion of previously unreacted nitric acid therein by the formation of nitrobenzene, (5) continuously removing said last-named nitrobenzene in benzene solution from said denitrator and introducing same into the primary reaction zone, and (6) continuously recycling at least a portion of the denitrated spent acid which is discharged from the denitrating zone into contact with the acid-wet nitrobenzene from the settling zone to remove a major portion of the dissolved nitric acid therefrom whereby said nitric acid may be recovered and fed to the denitrator for reaction there with benzene to form additional nitrobenzene.

2. A process as in claim 1 wherein the nitrobenzene from the settling tank, after separation from the spent acid and extraction of a major portion of the dissolved nitric acid with the denitrated waste mixed acid, is washed to remove the majority of any inorganic contaminants which still remain.

3. In the process for the preparation of nitrobenzene wherein benzene is reacted with an acid mix consisting essentially of an aqueous mixture of nitric and sulfuric acids, the improved method of refining the crude nitrobenzene obtained from the said reaction which comprises physically separating the crude nitrobenzene from the waste mixed acid, denitrating the waste mixed acid to remove nitric acid by contacting the waste mixed acid with benzene, and washing said crude nitrobenzene substantially free of nitric acid with said denitrated waste mixed acid to extract dissolved nitric acid.

4. A process as in claim 3 wherein the nitrobenzene is subsequently washed with water to remove the major portion of any remaining inorganic contaminants.

References Cited in the file of this patent

UNITED STATES PATENTS 2,773,911     Dubois et al.            Dec. 11, 1956